May 17, 1966 M. VANZO 3,251,384
METHOD AND APPARATUS FOR THE MANUFACTURE OF ANNULAR
STRUCTURES HAVING A FILIFORM ELEMENT HELICALLY
WOUND ABOUT AN IMAGINARY AXIS
Original Filed July 1, 1963 7 Sheets-Sheet 3
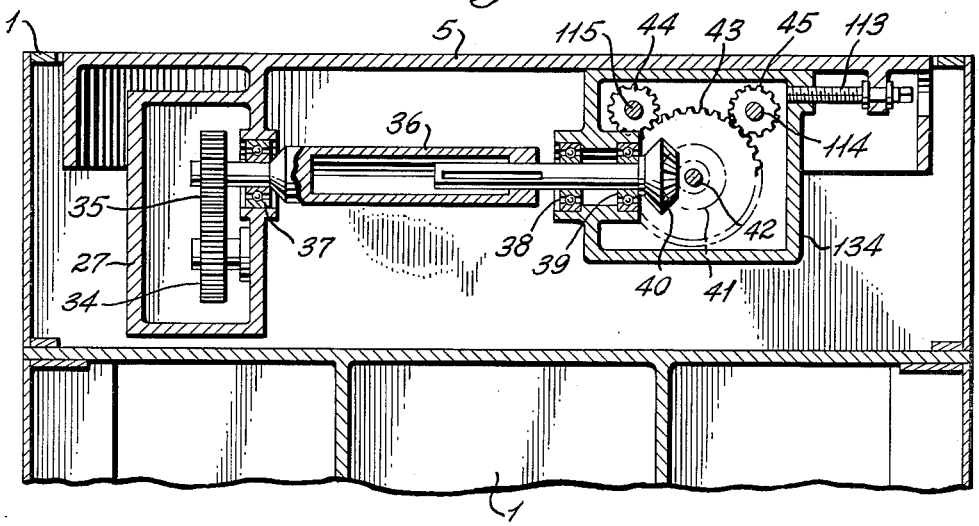
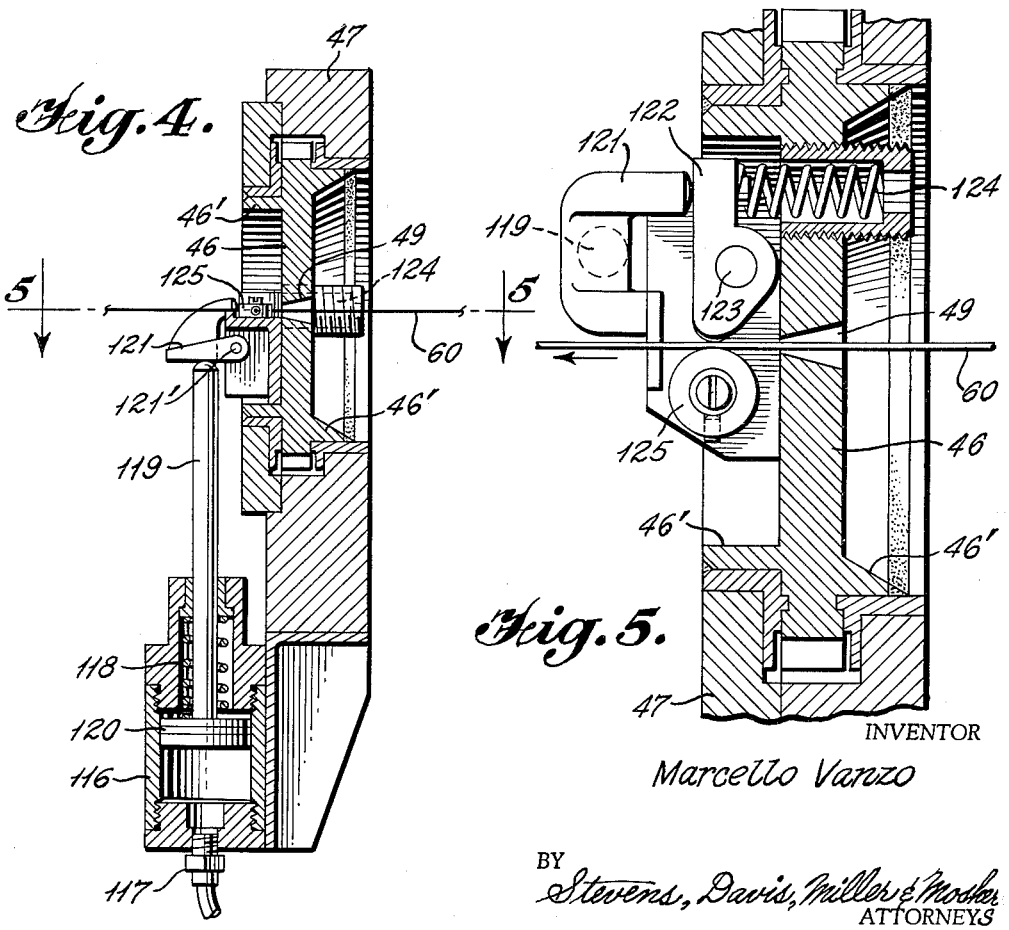
INVENTOR
Marcello Vanzo
BY Stevens, Davis, Miller & Mosher
ATTORNEYS

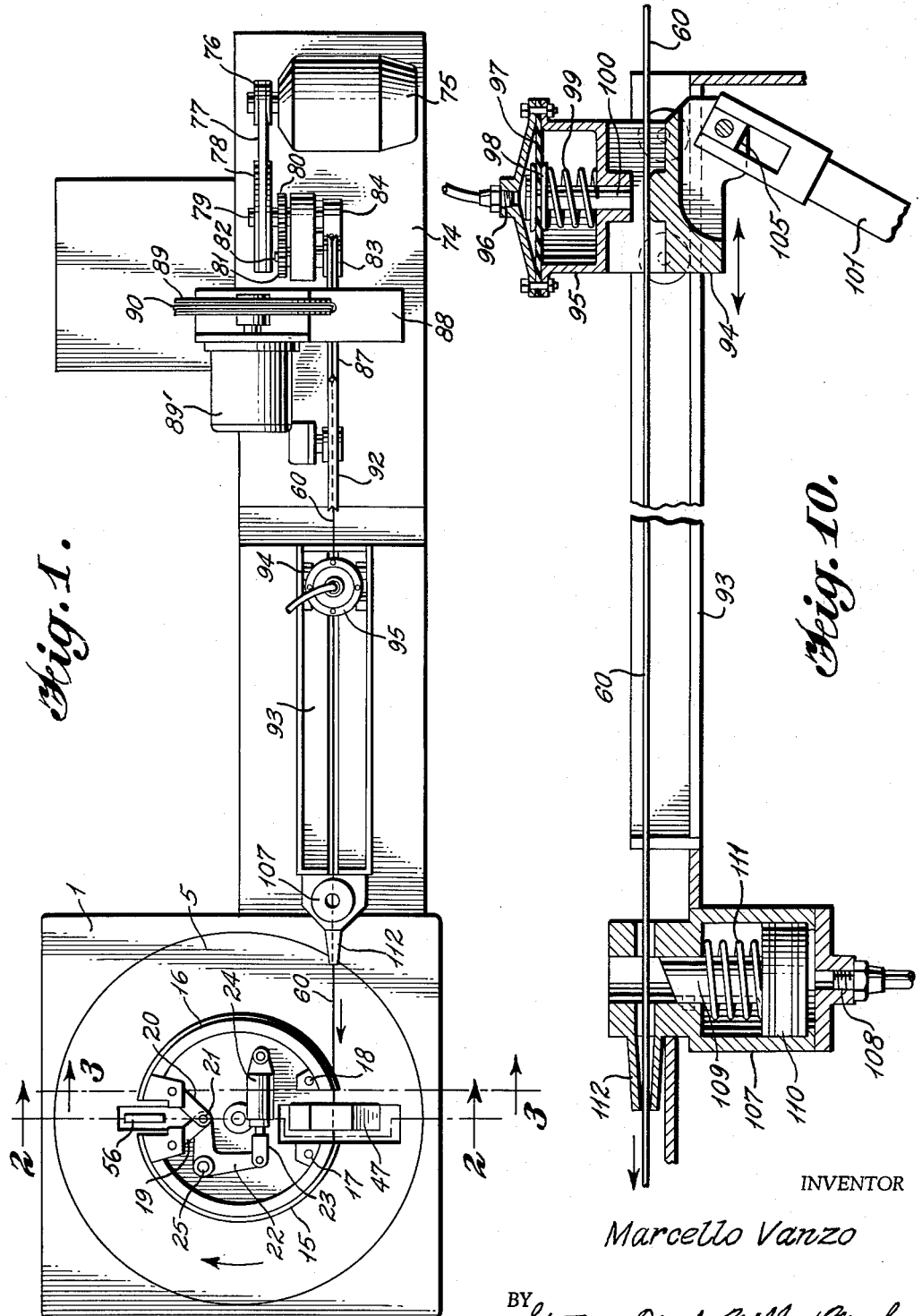

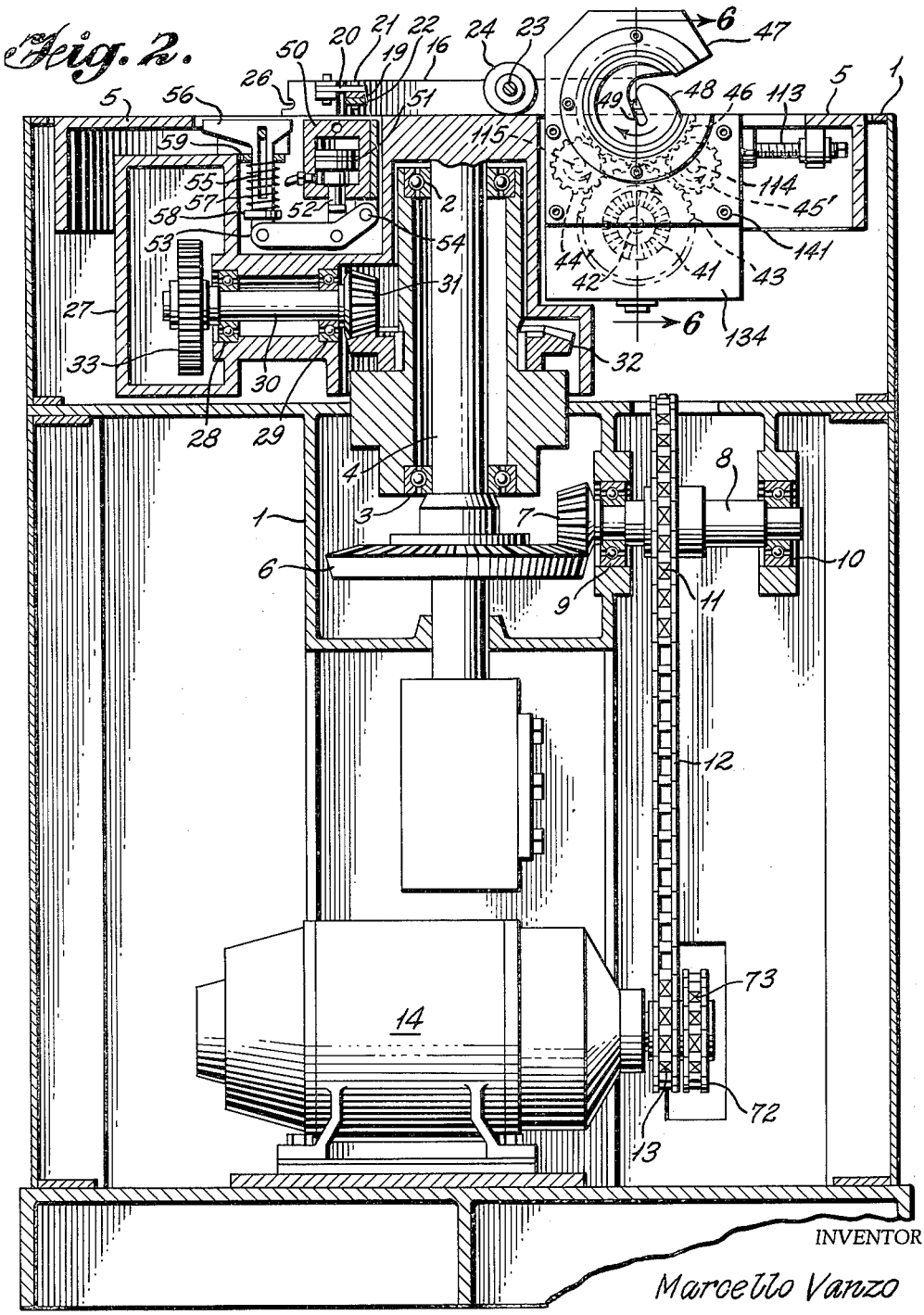

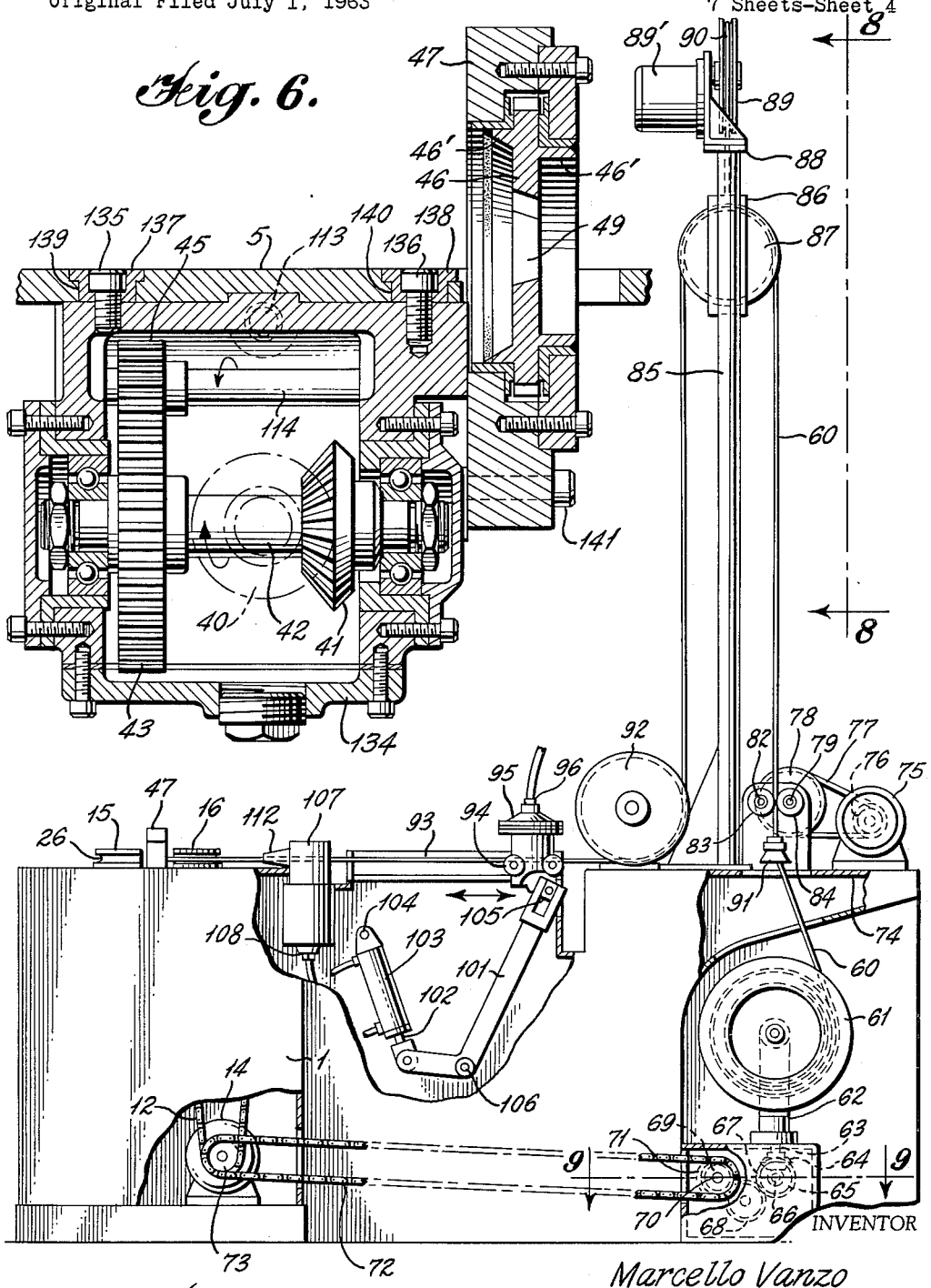

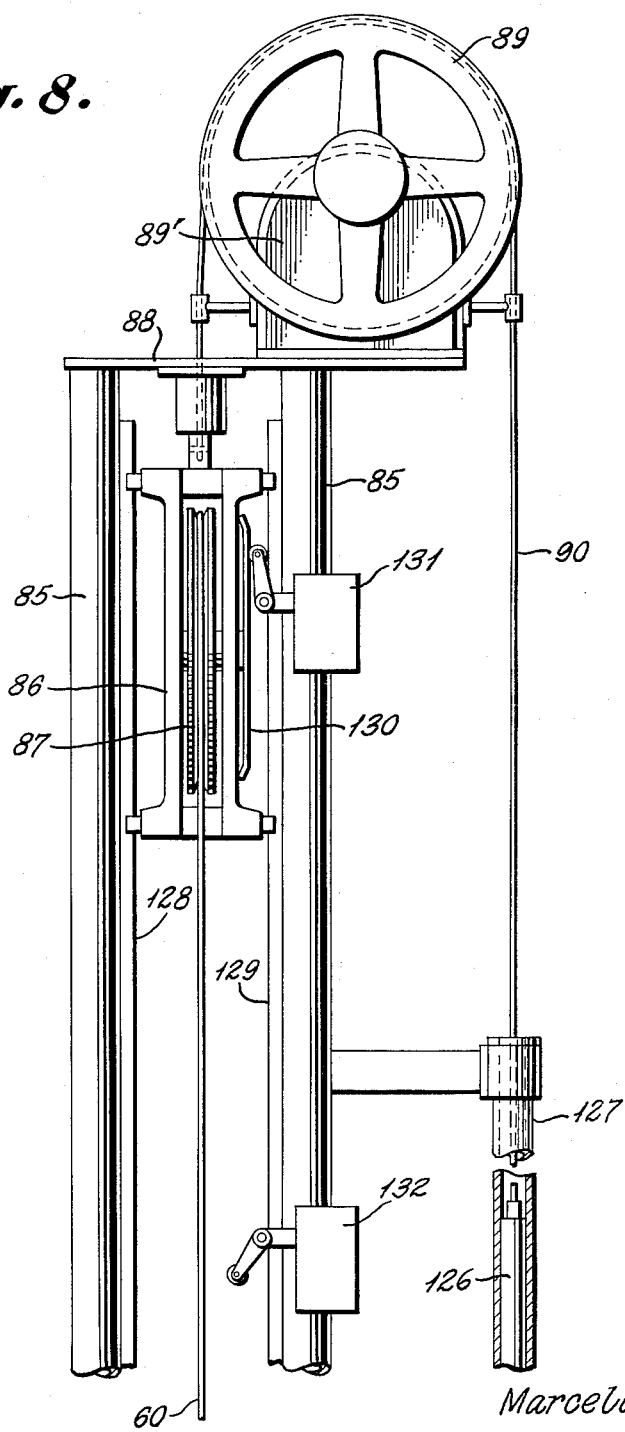

INVENTOR
Marcello Vanzo

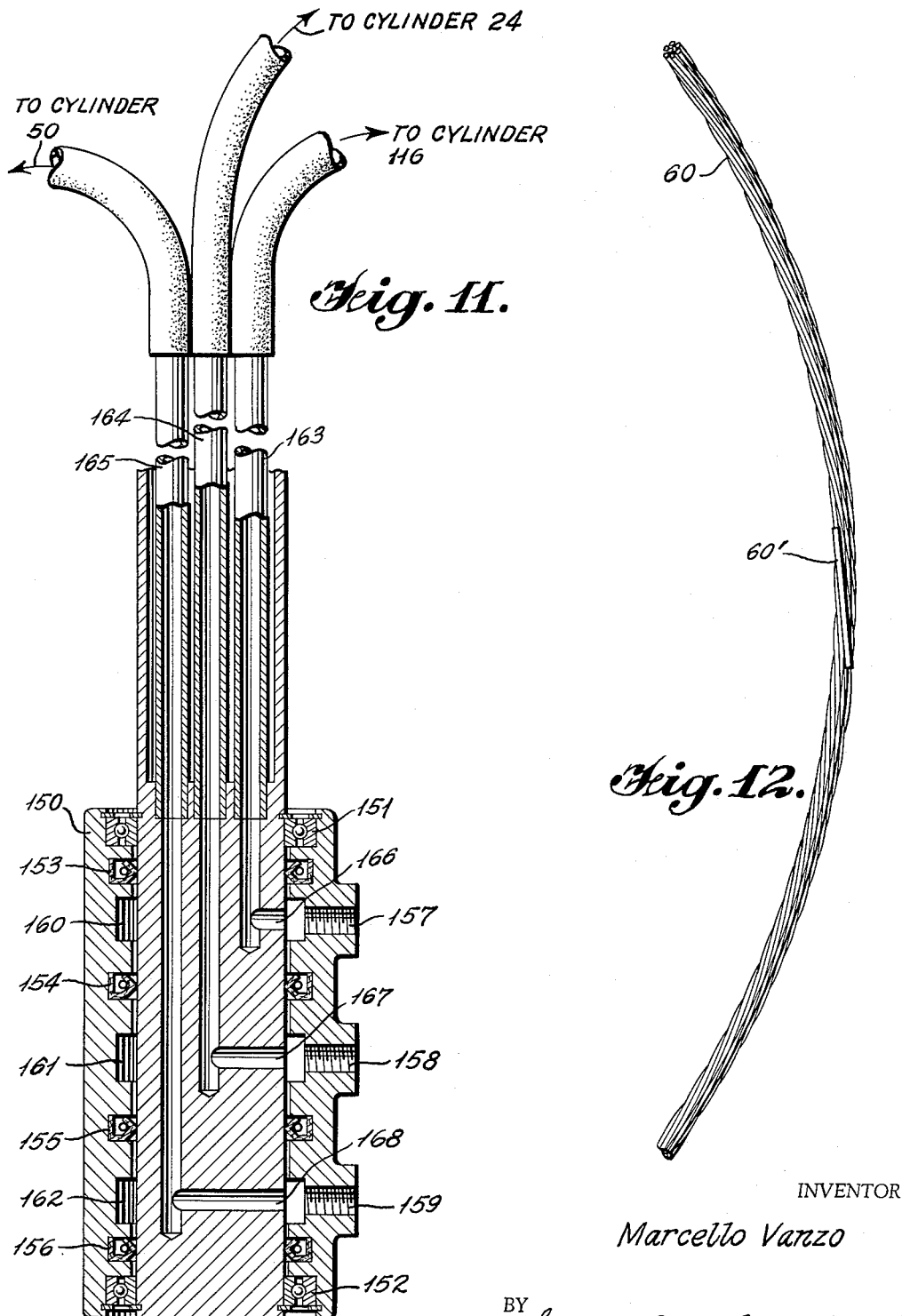

United States Patent Office 3,251,384
Patented May 17, 1966

3,251,384
METHOD AND APPARATUS FOR THE MANUFACTURE OF ANNULAR STRUCTURES HAVING A FILIFORM ELEMENT HELICALLY WOUND ABOUT AN IMAGINARY AXIS
Marcello Vanzo, Milan, Italy, assignor to Pirelli S.p.A., Milan, Italy
Continuation of abandoned application Ser. No. 291,855, July 1, 1963. This application Mar. 18, 1965, Ser. No. 444,912
Claims priority, application Italy, July 9, 1962, Patent 671,249
17 Claims. (Cl. 140—71)

This application is a continuation of application Serial No. 291,855 filed July 1, 1963, now abandoned.

The present invention relates to the manufacture of annular structures constituted by a single elementary or composite continuous filiform element helically wound about an imaginary circular axis, and in particular it pertains to making twisted-type coreless grommets for reinforcing the beads of pneumatic tires.

A co-pending application, Serial No. 273,413 filed April 16, 1963 of the same applicant, describes a method and a practical form af apparatus to obtain annular structures of the above-indicated type based on the use of an auxiliary core in the form of a continuous flexible ring of a generally circular cross section having a movement of rotation about its own axis of symmetry and a movement of rotation about an axis passing through the centers of its cross sections. While this method gives good results in the manufacture of annular structures having a diameter greater than 30 cm., it has been found to be not completely satisfactory with structures of smaller diameter, in particular in view of the difficulty encountered in rotating a core having a reduced cross section about the axis passing through the center of its cross sections.

The principal object of the present invention is the provision of a new and substantially different method for the automatic and continuous manufacture of annular structures constituted of an elementary or composite continuous filiform element whereby an end of the filiform element is at first directly or indirectly secured to one face of a disc having a central eyelet provided with a lateral inlet. Then, the disc or circular plate is caused to rotate about its own axis and at the same time the filiform element is supplied and disposed, repeatedly and continuously, along a circumference of prescribed diameter passing through the central part of the disc.

Each time the filiform element, during its disposition about said circumference, again reaches the rotating disc, one of its sections is threaded into the eyelet the inlet of which at that moment is disposed in correspondence with the supplied filiform element. The eyelet, during its continuous rotation together with the disc, acts on the sections of the element therein threaded and consequently imparts a rotation, about an imaginary axis, to the various coils of the filiform element disposed along the circumference causing them to be twisted, the pitch of the strand being a function of the ratio between the supply speed of the filiform element and the speed of rotation of the disc about its own axis.

On completion of the helically wound annular structure, the end of the filiform element secured to the disc is detached and the filiform element is separated from its source. Then, the ends of the annular structure are butt-jointed into a means which compels them to remain in that mutual position, or they may be welded to each other.

A further object of the present invention is the provision of a simple apparatus of high output, capable of carrying out the above-described method in a continuous and automatic manner.

The details of the method and of the apparatus forming the object of the present invention will be more clearly understood from the following description, made with reference to the attached drawings, which show the best means presently contemplated for practicing the method of the invention; wherein:

FIG. 1 is a top plan view of the machine and of the supply device for the same;

FIG. 2 is a vertical section of the machine on an enlarged scale and taken on the plane of line 2—2 of FIG. 1;

FIG. 3 is a fragmentary vertical section taken on line 3—3 of FIG. 1 and also on an enlarged scale;

FIG. 4 is a vertical section on an enlarged scale through the box 47 shown in plan in FIG. 1;

FIG. 5 is a sectional view on line 5—5 of FIG. 4;

FIG. 6 is a sectional view on an enlarged scale taken on line 6—6 of FIG. 2;

FIG. 7 is a front elevational view of the machine and supply device, in which some parts are broken away for illustrative purposes;

FIG. 8 is a fragmentary elevational view as seen from the right side of FIG. 7 but on an enlarged scale;

FIG. 10 is a fragmentary detail on an enlarged scale, with some parts in section, of the carriage assembly of the supply device;

FIG. 11 is a sectional view through the vertical shaft 4 showing the hydraulic fluid disrtibution system; and FIG. 12 is a fragmentary detail on an enlarged scale of a finished annular structure.

Figure 9:
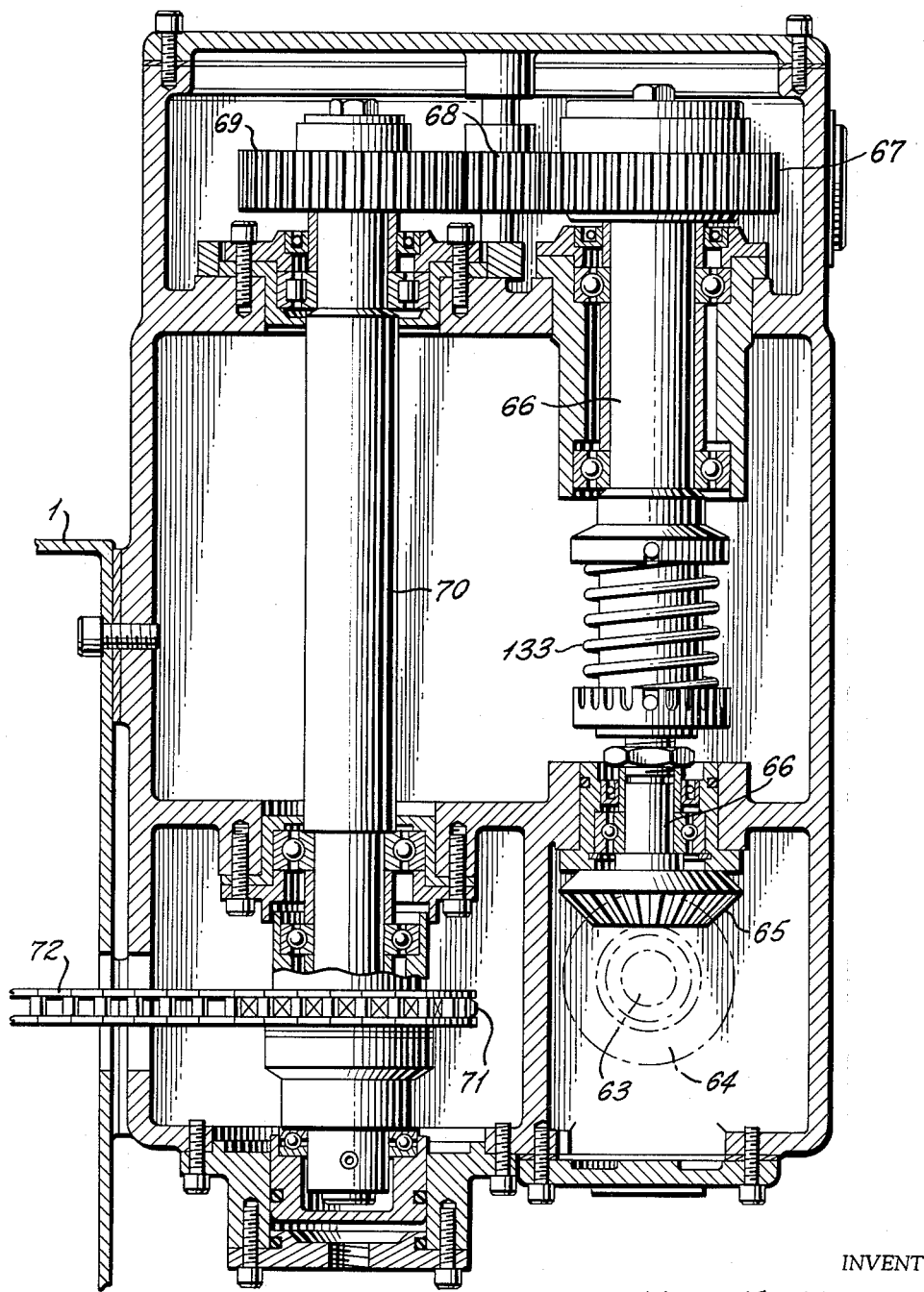
FIG. 9 is a sectional view, also on an enlarged scale, taken on line 9—9 of FIG. 7.

From the accompanying illustrative drawings it will be noted, as best shown in FIG. 2 thereof, that frame 1 carries by means of the ball bearings 2 and 3 a vertical shaft 4 integral with a revolving platform 5. On the shaft 4 there is keyed a bevel gear 6 which meshes with a bevel gear 7 keyed on a relatively short horizontal shaft 8 supported in frame 1 by ball bearings 9 and 10. On the shaft 8 there is also keyed a gear 11 which is connected through a chain 12 with a gear 13 keyed on the shaft of a motor 14.

On the platform 5 are assembled two substantially semicircular sectors 15 and 16, as best shown in FIG. 1, having one of their ends respectively pivoted on the pins 17 and 18, integral with the platform 5, and the other end respectively pivoted at one end of the levers 19 and 20 which, in turn, are pivoted on pivot pin 21 carried by one end of the bell-crank lever 22 pivoted at its opposite end of the stem 23 of a piston slidable in a double-acting cylinder 24. The bell-crank lever 22 is moreover pivoted at an intermediate point on a pivot pin 25 integral with the platform 5. The circular sectors 15 and 16 are provided with a peripheral groove 26.

In a support 27 (see FIG. 2) integral with the platform 5, there is mounted, by means of the ball bearings 28 and 29, a shaft 30 to the end of which is keyed a bevel gear 31 meshing with a fixed gear 32 integral with the frame of the machine. On the other end of the shaft 30 there is keyed a gear 33 meshing with a gear 34 (see FIG. 3) which meshes in turn with a gear 35 keyed at one end of a shaft 36, the length of which can be adjusted according to the diameter of the structure to be obtained. Shaft 36 is constituted by two telescopic elements and is assembled in the support 27 by means of the ball bearings 37, 38 and 39. At the other end of the shaft 36 there is keyed a bevel gear 40, meshing with a bevel gear 41 keyed on a small shaft 42 (see FIG. 6) on which there is also keyed a gear 43 meshing with two symmetrical gears 44 and 45 assembled respectively on one end of shafts 115 and 114 while on the other end of these shafts are keyed the gears 44' and 45' (see FIG. 2) equal to the gears 44 and 45, which mesh with a slotted crown gear provided on a disc 46 having two lateral projections 46' (see FIG. 4) slidable along two corresponding guides assembled in a box 47 divisible in two parts, between which the peripheral part of the disc is inserted. The axis of the disc lies in a vertical plane tangent to the circumference defined by the sectors 15 and 16.

In the slotted portion of the crown gear of the disc 46 there is a leading edge 48 and an eyelet 49. Near the eyelet 49 there are means about to be described fixed on the disc 46, which serve to clamp the free end of the wire 60 during the manufacture of the annular structure.

The means for clamping wire 60 to disc 46 is shown in FIGS. 4 and 5 and comprises a single acting cylinder 116, provided with a hole 117 for the intake and discharge of a compressed fluid, and a spring 118 inserted in its upper head and wound about stem 119, the lower end of the latter being connected to a piston 120. Spring 118, it will be noted is fastened to the upper face of the piston 120 and pushes the latter to its lower position when compressed fluid is discharged from the hole 117. The upper end of stem 119 is free and when the piston pushes this stem upwardly, the upper end engages a fork element 121 rotatable about pivot 121'. The upward rotation of the fork element 121 causes rotation of element 122 which is rotatable about a pivot 123, and also causes compression of spring 124. Ring 125 is assembled integral with disc 46, and rotation of the element 122 in a clockwise direction detaches the surface of the latter from the stationary ring 125 whereby the end of the wire 60 previously threaded in the eyelet 49 can be inserted between the element 122 and ring 125 and remains clamped therein when the compressed fluid is discharged from the hole 117 and consequently the spring 118 pushes the piston 120 downward and the spring 124 causes the element 122 to rotate in a counterclockwise direction.

Three hydraulic cylinders 24, 50, and 116, illustrated in FIGS. 1, 2, and 4 respectively, are mounted on the revolving platform 5. The means for providing fluid under pressure to these cylinders is shown in FIG. 11. A fixed box 150 is mounted on the lower end of the rotating shaft 4. The box is provided with the necessary bearings 151 and 152 and seals 153 to 156. Three connectors 157 to 159 are provided for connecting the box to a source of fluid under pressure (not shown). Each connector 157 to 159 respectively opens directly to an annular chamber 160 to 162 which surrounds the lower end of the shaft 4. The shaft 4 is hollow and contains therein three ducts 163 to 165, the lower ends of which are in communication with radial ducts 166 to 168 respectively. Each of the radial ducts 166 to 168 is in alignment with one of the annular chambers 160 to 162 respectively. The upper end of ducts 163 to 165 are at a level slightly higher than that of the upper face of the platform 5. The three annular chambers are separated by seals 154 and 155. The radial ducts 166 to 168 are in constant communication with an annular chamber during the rotation of the shaft 4 and therefore cylinders 24, 50, and 116 may be provided with a constant supply of fluid under pressure.

For purposes of simplification the means described above for clamping the free end of the wire 60 to the disc 46 have been omitted from FIG. 6, while being shown in detail in FIGS. 4 and 5. Moreover, it is pointed out that other less detailed means may be utilized, to secure one end of the wire or filiform element directly or indirectly to one face of the disc; for example, a screw would be sufficient.

Integral with the revolving platform 5 there is also assembled a single-acting cylinder 50 (see FIG. 2), which slidably receives a piston 51 on the upper end of a rod 52 which carries at its lower end a lever 53, one end of the latter being pivoted on a pin 54 integral with the platform 5 and the other end of which is pivoted on the lower end of a small shaft 55, at the upper end of which there is fastened a blade 56. The small shaft 55 is encircled by a compression spring 57, one end of which bears against a flange 58 mounted on the lower end of shaft 55 and the other end of which engages a support member 59 integral with the platform 5.

Referring to FIGS. 3 and 6 it will be noted that there is a saddle 134 slidable normal to the plane of the drawing in FIG. 6 by the externally threaded screw 113 shown in FIG. 3, the screw 113 meshing with an internal screw thread provided in an adjacent wall of saddle 134. The latter is suspended from the rotatable platform 5 by screws 135 and 136 supported by the blocks 137 and 138 slidably mounted along guides 139 and 140. Also, it will be noted that box 47 is secured to the saddle 134 by a plurality of screws 141. Gears 44' and 45' carried on shafts 115 and 114 are necessary due to the interruption of the crown wheel of disc 46 so that at least one of the gears 44' and 45' is constantly engaged with the crown wheel.

To supply the wire 60 to the machine there is a bobbin 61 (see FIGS. 7 and 9), having a horizontal axis, and supported by a bell-crank arm 62 keyed on the upper end of a shaft 63, a bevel gear 64, on shaft 63 meshes with a bevel gear 65 assembled on a horizontal shaft 66 provided with a flexible coupling 133. A gear 67 on the other end of shaft 66 meshes with a gear 68 which meshes in turn with a gear 69 keyed on a horizontal shaft 70. On shaft 70 there is also keyed a gear 71 connected through a chain 72 with a gear 73 keyed on the shaft of the motor 14. On the supporting stand 74 there is assembled a second motor 75 on the horizontal shaft of which there is keyed a pulley 76 connected by means of a belt 77 to a second pulley 78 keyed on a horizontal shaft 79 onto which is also keyed a gear 80, meshing with a gear 81 keyed on a shaft 82. On the front end of the shaft 82 there is keyed a roller 83, cooperating with a roller 84 keyed on the front end of the shaft 79. The stand 74 supports two vertical rods 85, parallel to each other and provided with longitudinal guides along which a saddle 86 is slidable and upon which there is rotatably assembled a pulley 87. On a cross bar 88 inter-connecting the two rods 85, there is rotatably assembled a pulley 89, connected to a rheostat 89', upon which passes a metallic rope 90. One end of the metallic rope 90 is connected to a counter weight 126 (see FIG. 8) slidable in a vertical guide 127, the other end of the rope 90 is secured to the upper part of the saddle 86 slidable along the guides 128 and 129. On one side of the saddle 86 there is a cam 130. The right vertical rod (see FIG. 8) carries microswitches 131 and 132. Microswitch 131 is actuated by the cam 130 when the festoon is completely loaded and stops the motor 75 which controls the supply of the wire 60. Microswitch 132 is actuated by the cam 130 when the festoon is completely unloaded, and also stops the motor 75. The purpose of rheostat 89' is to adjust the speed of motor 75. The stand 74 also carries a frusto-conical wire guide 91 and an idle pulley 92.

On a horizontal guide 93 (see FIG. 10) carried by the stand 74 there is slidably assembled a carriage 94, bearing a cylinder 95 provided with a top opening 96 for the introduction and the discharge of compressed fluid acting on a membrane 97 which in turn exerts a pressure on the piston 98 which is opposed by the helical spring 99 encircling piston rod 100, and disposed between the piston 98 and the bottom wall of the cylinder 95. The lower end of the rod 100 serves to clamp the wire 60 against the bottom wall of the carriage 94.

For the purpose of imparting reciprocal sliding of the carriage 94 along the guide 93, there is provided a bell-crank lever 101 (see FIG. 7), the lower end of which is pivoted on the rod 102 of a piston slidable within a double-acting cylinder 103, which latter is pivoted to a fixed pivot 104. The upper end of the lever 101 is bifurcated and bears slidably assembled, a shoe 105 pivoted on a depending projection of the carriage 94. The lever 101 is also pivoted at an intermediate point on a fixed pivot 106.

At the end of the horizontal guide 93 there is provided a cutter (see FIG. 10), consisting of a single acting cylinder 107 having a lower opening 108 for the introduction and the discharge of compressed fluid. The upper end of the rod 109 of the piston 110 which is slidable within the cylinder 107, terminates in a blade. Between the piston 110 and the upper part of the cylinder 107 there is inserted a helical spring 111 which opposes to the upward movement of the piston 110. Integral with the cutter, there is a wire guide 112.

In practicing the method for the manufacture of the helically wound annular structures in accordance with the present invention by means of the above-described apparatus, the motor 14 (see FIG. 7), through the gears 73 and 71 and the chain 72 and the gears 69, 68, 67, 65 and 64, rotates the arm 62 and the bobbin 61 supported thereby about a vertical axis passing through the axis of the wire-guide 91. This imparts rotation of the wire 60 about its own axis whereby it is paid off from the bobbin by virtue of the action of the drawing rollers 83 and 84, whose rotation in opposite directions is controlled by the motor 75 by maens of the pulleys 76, 78 and the belt 77, and of the gears 80 and 81. Accordingly, the wire passes on the pulley 87 which, by means of the rope 90 and of the pulley 89, controls the rheostat 89' and permits by varying its position on the festoon adjustment of the speed at which the wire is supplied to conform it to the manufacturing speed. Thereafter the wire passes below the pulley 92, through the cylinder 95, to the upper part of the cutter and to the wire guide 112, and is threaded through the eyelet of the disc 46 and clamped on the face of the disc 46 (see FIG. 5). The cylinder 24 (see FIG. 1) has previously been filled with compressed fluid introduced from its end opposite to that in which said cylinder is pivoted, whereby the two sectors 15 and 16 are expanded to constitute a circumference.

The revolving platform 5 (see FIG. 2) is caused to rotate by the motor 14 which, by means of the gears 11 and 13 and the chain 12 rotates the shaft 8 and therefore the bevel gear 7 which in turn actuates the bevel gear 6 and rotates the shaft 4 upon which the latter is keyed. The rotation of the shaft 4, besides causing rotation of the platform 5 also causes rotation of the support 27 integral with the shaft 4 and of the elements supported by support 27. As a result the gear 31 rolls on the gear 32 which is fastened to the frame 1 and imparts rotation to the shaft 30 and to the gear 33 keyed thereon. In turn, gear 33 drags into rotation the gears 34 and 35 and the shaft 36 as well as through the bevel gears 40 and 41, the small shaft 42 and the gears 43, 44, and 45. As a consequence, rotation is imparted to disc 46 about the axis of the latter in such a direction as to rotate the wire threaded in the eyelet in the same direction in which it was previously rotated by the arm 62. Therefore, the disc 46 rotates simultaneously about the shaft 4 and about its own axis.

At each turn of the platform 5 a further section of the wire 60 is threaded in the eyelet 49 of the disc 46 which, rotating continuously together with the disc, acts on the sections of wire contained therein and imparts to the various coils of the wire disposed in the recess 26 of the circular sectors 15 and 16 a rotation about an imaginary circular axis, resulting in a twisting of the wire, the pitch of the strand being a function of the ratio between the supply speed of the wire and the speed of rotation of the disc 46 about its own axis. As a result of the progressive increasing of the diameter of the helically wound annular structure, the two circular sectors are subjected to a corresponding rotation about the pivots 17 and 18 whereby the development of the recess 26 is reduced.

When the platform has completed a prescribed number of turns, the motors 14 and 75 are stopped and compressed fluid is injected through the opening 96 of the cylinder 95 (see FIG. 10) in order to bring about clamping of the wire 60 passing through it by means of the stem 100. Then compressed fluid is also injected through the opening 108 in order to drive the rod 109 and the associated blade upwardly, thus cutting the wire. The blade is lowered immediately afterwards under the action of the spring 111 due to discharge of the compressed fluid from the cylinder 107. At this time, to remove the resulting annular structure from the machine, additional rotation of the sectors 15 and 16 about the pivots 17 and 18 respectively is carried out by means of the piston slidable within the cylinder 24 to sufficiently reduce the development of the circumference previously defined by the recess 26 (see FIG. 1). Furthermore, compressed fluid is injected through the opening 50' of the cylinder 50 (see FIG. 2), to raise the blade 56 which pushes upward the annular structure and causes it to overturn towards the eyelet from which it is unthreaded as soon as its end is removed from the clamping means. The blade 56 is immediately retracted into its housing by the spring 57, which had previously been subjected to compression as a result of the discharge of compressed fluid from the cylinder 50.

Upon commencing the manufacture of a new annular structure, compressed fluid is injected in the cylinder 24 to again expand the sectors 15 and 16 whereby the recess 26 may define a circumference (see FIG. 1), and compressed fluid is injected in the cylinder 103 from the end at which it is pivoted on the pivot 104 (see FIG. 10), so that the bell-crank lever 101 may slidably displace the carriage 94 to the left. After the end of the wire has been suitably clamped to a face of the disc 46, compressed fluid is discharged from the opening 96 in order that the spring 99 may again raise the rod 100 and may free the wire previously clamped therein. Also, compressed fluid is discharged from the opening of the cylinder 103 through which it had been previously injected and compressed fluid is injected through the opposite end of the cylinder 103 to move the carriage 94 to the right.

When the resulting annular structure serves as a reinforcing wire for the beads of the pneumatic tires, the two ends of the wire are butt-jointed by threading them into the opposite ends of a suitable sleeve or by welding them. FIG. 12 illustrates a fragmentary portion of a completed annular structure with the ends joined by a sleeve 60'.

The method and the machine as described above have numerous advantages over those described in the above-identified prior application of the same applicant, primarily due to the elimination of the auxiliary core about which the wire is wound, such as:

A notable reduction of the time necessary for manufacturing the annular structure inasmuch as unthreading the core from the structure on completion of the manufacturing operation involved more time than that required to wind the wire about the core, and the consequent possibility of employing a single operator to work two machines simultaneously;

A marked reduction of waste material, mainly due to the inconstant development of the core because of the variation of the elastic and mechanical characteristics of the same during use;

A substantial reduction and simplification of the maintenance as the sectors in the cavity of which the annular structure is obtained are rigid and maintain their features;

The possibility of manufacturing annular structures having a remarkably smaller diameter;

In the utility of a change gear to take into account the greater thickness of the core in the next turns, due to the presence on the core of the previously wound wire coils.

It is understood that the principle of the invention remaining unvaried the details of the machine and the forms of realization of the method can be widely varied with respect to what is described and illustrated only by way of non-limiting example without departing from the scope of the invention itself. For example, the disc which determinates by rotating about its own axis the helical winding of the filiform element can be provided with several eyelets disposed side by side in order that the various sections of the filiform element be separated with respect to one another or the eyelets may have a configuration different from that illustrated by the drawings whereby the various sections of the filiform element are not aligned but have a different disposition.

Furthermore, the disc may be so adjusted that its plane does not pass through the axis of rotation of the revolving platform. Also, instead of a single disc, it is possible to provide a plurality of discs, disposed at an equal or different distance along the circumference described by them during rotation about the axis of the revolving platform, and the plane of these discs may be disposed radially to intersect the plane of the others along said axis or have a different adjustment.

Finally, the disc or discs may rotate only about their own axis and the wire can be disposed along the circumference defined by the circular sectors by means of a wire-guide rotating about an axis passing through the center of the circumference and normal to the plane containing the same.

What is claimed is:

1. A method for manufacturing annular structures having a continuous filiform element helically wound about an imaginary circular axis, comprising the steps of temporarily fastening one end of said filiform element to one face of a disc having a central eyelet provided with a lateral inlet, rotating said disc about its own axis and simultaneously repeatedly disposing the filiform element along a circumference of preestablished diameter passing through the central part of said disc whereby each time the filiform element during its repeated disposition about said circumference again reaches the rotating disc, one of its sections is threaded in said eyelet.

2. The method of claim 1, including the step of causing the disc to rotate simultaneously about its own axis and about a second axis normal to the first and passing through the center of said circumference along which the filiform element is disposed.

3. The method of claim 1, including the step of disposing the filiform element about said circumference by rotating a guide about an axis passing through the center of said circumference and normal to a plane comprising the same.

4. A method for manufacturing annular structures having a continuous filiform element helically wound about an imaginary circular axis, comprising the steps of temporarily fastening one end of said filiform element to one face of a disc having a central eyelet provided with a lateral inlet, rotating said disc simultaneously about its own axis and about a second axis normal to the first axis and contained in the plane of the disc itself, disposing the filiform element along the circumference of a circle described by the rotation of said eyelet about said second axis, the rotating disc threading into said eyelet a section of said filiform element during each repeated disposition about said circumference.

5. The method according to claim 4 wherein the lengths of said filiform element comprised between two subsequent sections of it threaded in the eyelet are compelled by the rotation of said eyelet to rotate about an imaginary axis concentric with respect to said circumference and to twist each other.

6. The method according to claim 4 wherein said filiform element, before being disposed along the circumference, is rotated about its own axis in a direction equal to that according to which it is then rotated by the disc.

7. The method according to claim 4 wherein upon completion of the helically wound structure, the ends of the filiform element are fixed in a butt-jointed relationship.

8. A machine for the manufacture of annular structures having a continuous filiform element helically wound about an imaginary circular axis comprising a rotatable circular winding form, a radial slot in the periphery of said form, a rotatable disc mounted in said slot with the axis of said disc tangential to the periphery of and coplanar with said form, said disc having a centrally located eyelet, said eyelet provided with a lateral inlet for receiving at least one section of the filiform element, means for feeding said filiform element to said disc, means for temporarily fastenig one end of the filiform element to one face of said disc, means for rotating said disc about its own axis while simultaneously rotating said form and said disc about the axis of the former, whereby said filiform element will be repeatedly disposed about said form while being rotated about an imaginary circular axis of said annular structure.

9. A machine according to claim 8 wherein said winding form comprises at least two adjustable, retractable cylindrical segments, a back plate, said cylindrical segments pivotally mounted on said back plate, retracting means mounted on said back plate and operatively connected to said segments, and a groove in the outer peripheral surface of said cylindrical segments to receive the annular structure during its manufacture.

10. A machine according to claim 8 wherein a plurality of eyelets are provided in said disc disposed side by side in order that the various sections of the filiform element be separated with respect to one another.

11. A machine according to claim 8 wherein the relative speed of rotation of said form and said disc determines the pitch of the filiform element on the annular structure.

12. A machine according to claim 8 wherein said filiform element is fed to the machine from a bobbin.

13. A machine according to claim 8 wherein said winding form is provided with means for removing a finished annular structure therefrom.

14. A machine according to claim 8 wherein means are provided to impart to the filiform element a rotation about its own axis in the same direction of the rotation subsequently imparted to it by the disc during the rotation of the latter about its own axis.

15. A machine according to claim 8 wherein said means for feeding said filiform element comprises a revolving arm supporting a bobbin upon which said filiform element is wound, said arm being normal to the axis of said bobbin, and means to rotate said arm about an axis normal to the axis of said bobbin.

16. A machine according to claim 8 wherein means are provided to supply at the commencement of each manufacturing cycle one end of the filiform element to said means for temporary fastening of the same.

17. A machine according to claim 8 wherein said disc is peripherally provided with a crown gear which is interrupted in correspondence with the lateral inlet of said disc and means for rotating said crown gear comprising at least two gears at least one of which is in engagement with said crown gear at all times.

References Cited by the Examiner

UNITED STATES PATENTS

| | | | |
|---|---|---|---|
| 1,294,160 | 2/1919 | Pratt | 245—1.5 |
| 1,522,797 | 1/1925 | Beyea | 245—1.5 |
| 1,522,798 | 1/1925 | Beyea | 245—1.5 |
| 1,738,018 | 12/1929 | Pfeiffer et al. | 156—422 |
| 2,753,678 | 7/1956 | Hansen et al. | 245—1.5 |
| 2,902,083 | 9/1959 | White | 156—136 |
| 2,979,109 | 4/1961 | Dieckmann | 156—422 |

RICHARD J. HERBST, *Primary Examiner.*